Dec. 27, 1955
C. A. DE GIERS
2,728,546
VIBRATION-RESISTANT MOUNTING FOR
A CAPACITOR TYPE TANK UNIT
Filed May 21, 1953
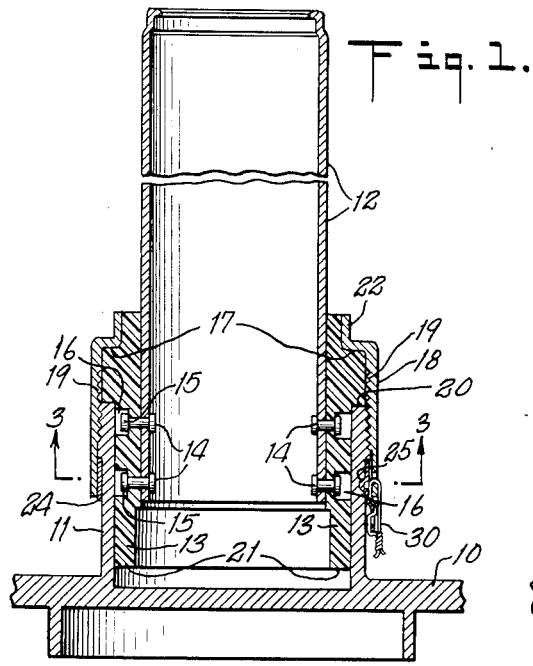
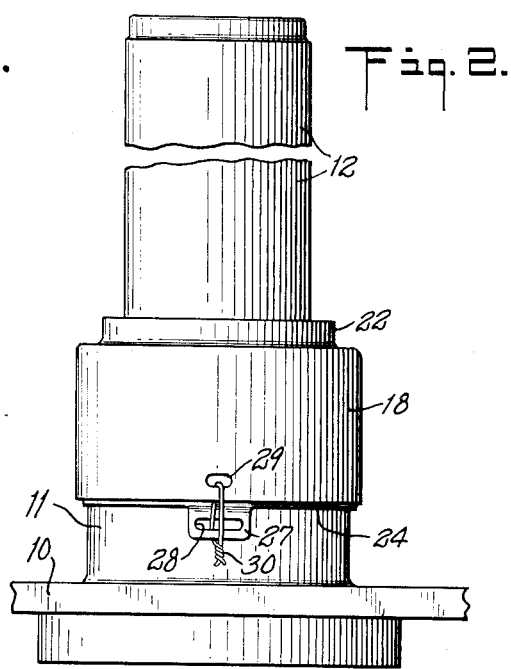
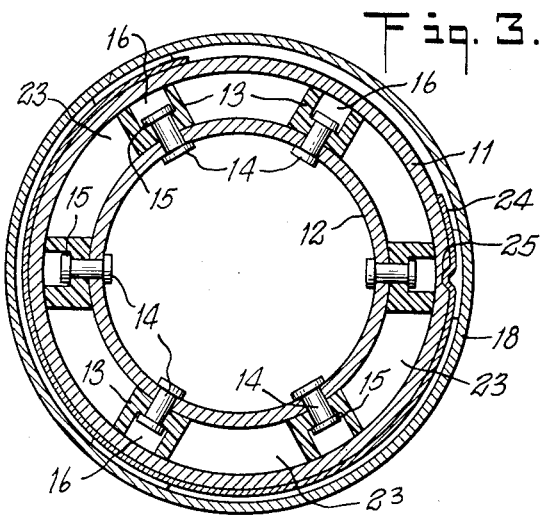
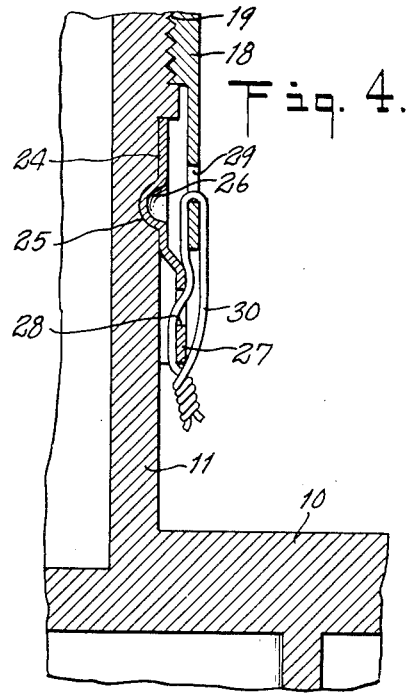
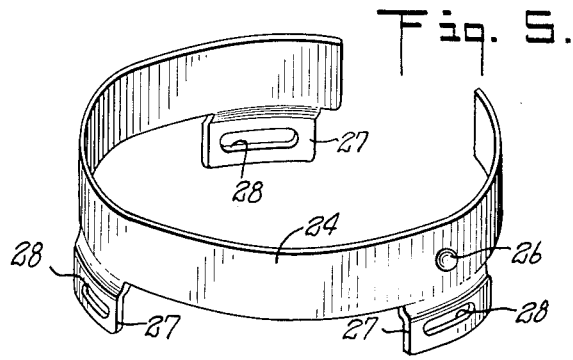
INVENTOR.
CLARENCE A. deGIERS
BY
Robert S. Dunham
ATTORNEY

United States Patent Office 2,728,546
Patented Dec. 27, 1955

2,728,546

VIBRATION-RESISTANT MOUNTING FOR A CAPACITOR TYPE TANK UNIT

Clarence A. de Giers, Roslyn, N. Y., assignor to The Liquidometer Corporation, Long Island City, N. Y., a corporation of Delaware Application May 21, 1953, Serial No. 356,453

2 Claims. (Cl. 248—358)

The present invention relates to a vibration-resistant mounting for a capacitor type tank unit. More particularly the present invention relates to a mounting for a capacitor type tank unit, such as are now being commonly used for sensing the height of liquid in a tank, particularly fuel in airplane fuel tanks.

Such sensing units are widely used at the present time in conjunction with some type of electric capacity-sensitive circuict means, by which a meter can be made to indicate variations in electrical capacity. By suitably calibrating the entire apparatus, the capacity measuring means may be caused to indicate fuel volume directly. By further introducing into the sensing system one or more additional factors compensating for density of fuel, temperature, etc., the indicating meter or means may be made to indicate directly the weight of the fuel present in the tank.

Inasmuch as apparatus of this kind is now used in airplanes and as such planes are subjected to very substantial vibrational forces, it is necessary, in order to provide a sensing unit having a reasonably long life, to provide a mounting which is resistant to a maximum extent to damage due to vibrational forces. The provision of such a mounting is a principal object of the present invention.

While it is largely necessary and conventional practice that there be some type of electrical insulation between the tank unit and the walls or structure of the tank which is to be gauged, the present invention provides such insulation in a way in which the insulation itself may absorb vibrational stresses, thus serving a dual purpose.

The present invention may be summarized as a vibration-resistant mounting for a capacitor type tank unit which includes a cylindrical shell forming a part of the tank unit and a housing member which is adapted to be secured to and/or otherwise held rigid with the tank in which the tank unit is to be installed. The mounting of the present invention provides a means for securing such a shell to the housing member. From a broad point of view this mounting means comprises a spacer means, formed of a resilient, organic plastic composition, which is secured on the one hand to an end portion of the cylindrical shell and on the other hand to the housing member and thereby to the tank in which the capacitor type tank unit is installed.

From a more detailed point of view, the housing member is provided with a cylindrical portion having a greater inside diameter than the external diameter of the cylindrical shell, the spacer means comprising a plurality of separate spacer members of non-electricity conducting material, preferably resilient in character, such as organic plastic material compositions, the spacer members being secured respectively to the shell and to the cylindrical portion of the housing. The means for securing the spacer members as aforesaid include rivets securing the spacer members to the shell and a shouldered sleeve or locking member which engages complementary shoulder portions on the spacer members, the sleeve or locking member being threaded on the outside of the cylindrical portion of the housing, coupled with means to prevent the inadvertent unscrewing of the locking member.

The details of a preferred form of construction embodying the present invention are set forth hereinafter and are illustrated in the accompanying drawings in which:

Fig. 1 is a view substantially in longitudinal central section (here assumed to be vertical section) of a cylindrical shell and its mounting means in accordance with the present invention, the view being foreshortened as to the shell for convenience of illustration;

Fig. 2 is a view of the structure of Fig. 1 taken at right angles thereto as seen from the right-hand side of Fig. 1 and with the parts in elevation;

Fig. 3 is a view taken substantially on the line 3—3 of Fig. 1 and on a somewhat enlarged scale;

Fig. 4 is a fragmentary detailed view similar to a portion of Fig. 1, but on a substantially enlarged scale; and Fig. 5 is a view in perspective of a locking ring.

Turning now to the accompanying drawings wherein there is illustrated an embodiment of the invention which is presently preferred, there is shown a housing member 10 which may be of any desired form, including that generally illustrated in Figs. 1, 2 and 4 and which is adapted to be secured in any suitable manner (not shown) to a tank in which the tank unit is to be mounted. The manner in which the housing member 10 is mounted in the tank forms no necessary part of the present invention and may be assumed to be conventional. In its preferred form the housing member 10 is provided with a vertically extending cylindrical portion or flange 11 which may be integral or otherwise formed rigid with the remainder of the housing member 10. These parts in the usual construction will be of metal. The inside diameter of the cylindrical portion 11 is greater than the outside diameter of a cylindrical shell 12, which is to be secured thereto by mounting means embodying the present invention.

From a broad point of view what is necessary to effect a mounting of the shell 12 on to the portion 11 is an intermediate mounting means, which is normally of a non-electricity-conducting material and which is, in accordance with the present invention, formed of an organic plastic material composition. As such, this intermediate means or spacer means, as it is hereinafter called, is resilient by reason of the material of which it is composed, as well as being a non-conductor of electricity. It serves both to insulate the shell 12 electrically from the housing member 10 and hence from the tank to which the member 10 is suitably secured and also serves to dampen any vibrational forces effective on the tank and on the member 10 before permitting these forces to be transmitted to the tank unit, including the shell 12.

The spacer means may be formed, as aforesaid, of many types of electrical non-conducting materials, but preferably is of some organic plastic composition. By this term there is meant to be included: rubber compositions, including hard rubber, compounded as is now conventional in the art with non-electricity-conducting solid matter of various kinds, synthetic organic plastic materials, including resins, esters and many others which are now well known in this art, some relatively hard natural gum materials and compositions made therefrom, asphalt-base compositions and many other similar materials known in the art of electrical insulation; provided only that such materials shall have sufficient structural strength to serve the purposes for which this structure is designed.

The spacer means may be formed as a single annular member, which is arranged to be secured to the shell 12 and by separate means to the cylindrical portion 11 or some other part rigid with the housing member 10. In the present instance, however, it is preferred that the spacer means be formed as a plurality of similar spacer members 13, there being six such members in the device shown in the drawings, as best seen in Fig. 3. The spacer members 13 are disposed, preferably at uniform intervals, around the periphery of the lower end, as seen in Fig. 1 of the shell 12 and are secured thereto by rivets 14 or in any other suitable way. When rivets as 14 are used, the heads 15 thereof are preferably disposed in countersunk holes 16 formed in the spacer members as shown, so that the heads of these rivets, which may be of metal, will not engage the flange or cylindrical portion 11 and hence will not serve to conduct electricity between the shell 12 and the housing member 10.

For securing the spacer members collectively to the cylindrical portion 11 of the housing member 10, each of the spacer members 13 is provided with a shoulder 17 facing toward the opposite end of the shell 12 from which the spacer members are secured, in other words, facing toward the top end of the shell 12, as seen in Fig. 1. An annular locking member 18 is provided, having an annular and downwardly directed shoulder portion adjacent to its upper end, as seen in Fig. 1, engaging the shoulders 17 of the spacer members 13. The locking member 18 is further provided with screw threaded portion 19, engaging complementary screw threads on the outside of the cylindrical portion 11 of the housing member 10. Thus by tightening the locking member 18, the constricted portion thereof engaging the shoulders 17 of the spacer members 13 will force all these members, and hence the shell 12 secured thereto, downwardly as seen in Fig. 1. This downward movement is limited by a downwardly directed shoulder portion 20 formed on each of the spacer members 13 and engaging the upper or outer end of the cylindrical portion 11, as best seen in Fig. 1. While the shoulder portions 20 are used in the embodiment of the invention here shown as stops, it is contemplated that the lower end portions 21 of the spacer members 13 could be extended to engage against the portion of the member 10 inside the cylindrical portion 11 for the same purpose. Such a variation of the construction particularly illustrated, is to be considered a part of the present invention.

It is noted that the locking member 18, even as to its constricted portion indicated at 22 is of larger inside diameter than the outside diameter of the shell 12 and is spaced away from the shell by the spacer members 13. In this way, the housing member 10 and the locking member 18 are electrically insulated from the shell 12; and any vibrational force imparted thereto from any source will be transmitted to the shell 12 and to the tank unit solely through the spacer members 13. Due to the resilient construction of these members as aforesaid, these vibrational forces will be substantially dampened before being transmitted to the shell 12 and the tank unit carried thereby and/or including this shell.

There is another advantageous function of the use of a plurality of spacer members 13 spaced apart as shown best in Fig. 3, with the spaces therebetween, indicated at 23, communicating between the space within the shell 12 and the space outside this shell; in that, depending upon whether the mounting shown is below or above the liquid in the tank there will be a restricted but constantly open liquid or gaseous communication between the inside and the outside of the shell 12, which is a desirable and usually necessary feature in a construction of this kind.

Means are provided in accordance with the present invention to prevent inadvertent unscrewing of the locking member 18 from the cylindrical portion 11. For this purpose there is provided, in the embodiment of the invention shown in the accompanying drawings, a locking ring 24 illustrated in perspective in Fig. 5 and illustrated on an enlarged scale in Fig. 4. This locking ring need not be a complete annulus and is not so, as shown in Fig. 5. It may be positioned around the cylindrical portion 11 prior to the assembly of the other parts hereinabove described or thereafter, as desired. The locking ring 24 is prevented from rotating in respect to the cylindrical portion 11 by the provision of a recess 25 formed in this cylindrical portion, as best seen in Figs. 3 and 4, and a complementary struck-up portion 26 of the locking ring 24 which is adapted to be seated in this recess as shown. The locking ring 24 may further be provided with one, or preferably a plurality, of depending portions 27 each of which is provided with a hole 28, preferably elongated, as shown. One or more depending portions of the locking member 18 may similarly be provided with a hole or holes, as shown at 29, Figs. 2 and 4. A suitable wire loop, as shown at 30, may be fastened between adjacent tie holes 28 and 29 as best illustrated in Figs. 2 and 4. Thus, as the locking ring 24 is secured against rotation in respect to the cylindrical portion 11 by the recess 25 and complementary portion 26 and as it is wired to a depending part of the locking member 18 by the wire 30, it will be seen that the locking member 18 may not be inadvertently unscrewed from the cylindrical portion 11 incident to vibrational forces, for example, and in fact can be removed from the portion 11 only by first removing the wire 30. It is contemplated that other means for preventing undesired and inadvertent unscrewing of the locking member 18 may be substituted for that particularly shown and described if desired.

While there is herein illustrated and described but one principal embodiment of the invention and certain possible alternative constructions have been suggested, it is intended that all alternatives as may occur to those skilled in the art from the foregoing description and drawings shall be considered a part of the present invention, as defined in the appended claims, which are to be construed validly as broadly as the state of the art permits.

What is claimed is:

1. A vibration isolating mounting for a capacitor type tank unit, including a cylindrical shell forming a part of a tank unit, a housing member adapted to be held rigid with a tank, said member comprising a rigid cylindrical portion having a substantially greater inside diameter than the outside diameter of said shell, said shell extending a substantial distance in telescopic relation into said cylindrical portion, and means securing said shell to said cylindrical portion; said means comprising a plurality of spacer members of resilient electrical insulating material secured to and at spaced intervals about the periphery of the telescoped end of said shell, each of said spacer members having a radial flange formed thereon, one side of said flange abutting the end of said cylindrical portion, an annular locking member having a portion engaging the other side of said flange and having another portion threadedly engaging said cylindrical portion of said housing member, said spacer members being interposed between said locking member, said housing member and said shell to hold said members out of electrical contact with said shell.

2. A vibration isolating mounting according to claim 1, comprising in addition, means for preventing accidental rotation of said annular locking member with respect to said cylindrical portion of said housing member.

References Cited in the file of this patent

UNITED STATES PATENTS

| 1,322,434 | Haskell | Nov. 18, 1919 |
| 1,405,225 | Kimball | Jan. 31, 1922 |
| 1,448,555 | McGill | Mar. 13, 1923 |
| 2,402,003 | Zublin | June 11, 1946 |
| 2,574,191 | Platzer | Nov. 6, 1951 |
| 2,669,465 | Newell | Feb. 16, 1954 |